Figure 1:
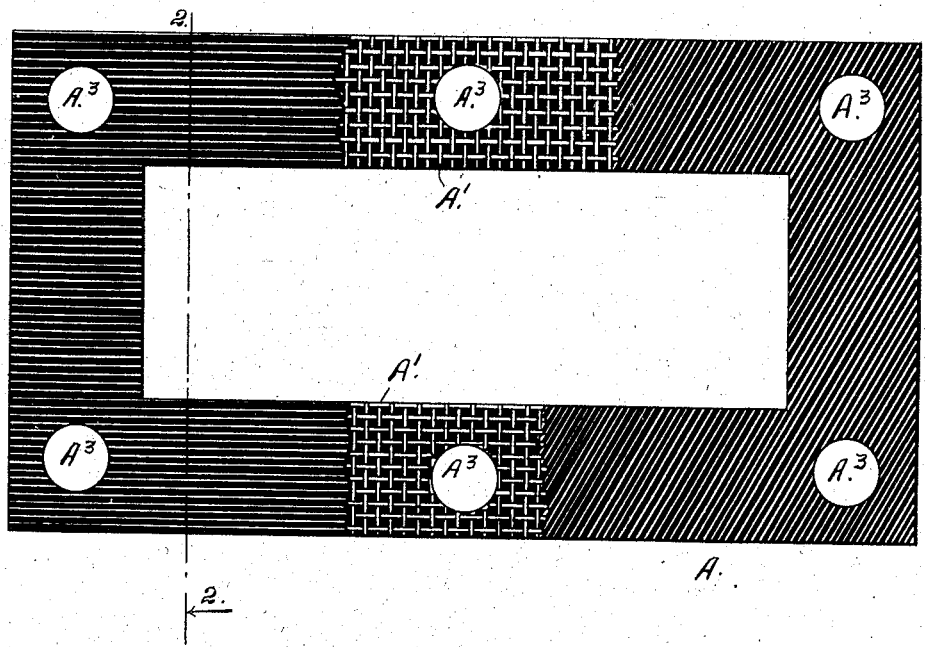

No. 791,552. PATENTED JUNE 6, 1905.
R. C. HANCE.
GASKET MATERIAL.
APPLICATION FILED JUNE 30, 1904.

Witnesses
Otto E. Hoddick
Dena Nelson

Ralph C. Hance,
Inventor

By A. D. S. Meen
Attorney

No. 791,552.

Patented June 6, 1905.

UNITED STATES PATENT OFFICE.

RALPH C. HANCE, OF HOLMES, WYOMING.

GASKET MATERIAL.

SPECIFICATION forming part of Letters Patent No. 791,552, dated June 6, 1905.

Application filed June 30, 1904. Serial No. 214,766.

*To all whom it may concern:*

Be it known that I, RALPH C. HANCE, a citizen of the United States, residing at Holmes, in the county of Albany and State of Wyoming, have invented certain new and useful Improvements in Gasket Material; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in gasket material adapted for use in making tight joints and wherever material of this kind is desired.

My object is to provide a material of this class which shall possess greater durability than the ordinary product or article of manufacture.

The improvement consists in placing a layer of wire-mesh material within the rubber previous to vulcanization, so that after vulcanization the wire mesh is secured therein and forms a part of the article. If only one layer of the mesh is used, it is preferable to place it in the center or approximately in the center or half-way between the opposite surfaces of the device. While in the drawings I have only shown one layer of mesh material, it is evident that more than one layer may be used, if desired, though one is believed sufficient and considered preferable. This wire mesh greatly strengthens the fabric and greatly increases its life. The wire mesh may be used in combination with the ordinary layers of canvas, if desired. In the drawings forming a part of this application I have shown the gasket material with the wire mesh alone and also with the wire mesh together with layers of canvas.

Having briefly outlined my improved article of manufacture, as well as the function it is intended to perform, I will proceed to describe the same in detail, reference being made to the accompanying drawings, in which is illustrated an embodiment thereof.

Figure 2:
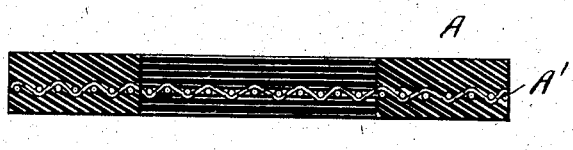
Figure 3:
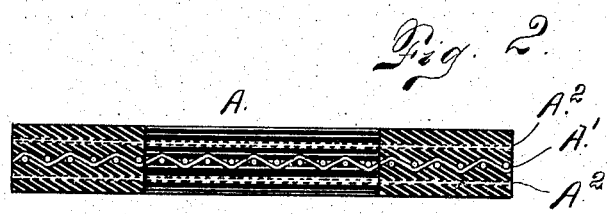

In the drawings, Figure 1 illustrates my gasket material cut to cover the top of a steam-chest in ordinary slide-valve mechanism, the rubber being partly broken away on one side to disclose the wire mesh. Fig. 2 is a section taken on the line 2 2, Fig. 1. Fig. 3 is a similar section showing layers of canvas on opposite sides of the wire mesh.

The same reference characters indicate the same parts in all the views.

Let A designate the body of the gasket material, A' the wire-mesh material, and $A^2$ the layers of canvas when the latter are employed. As shown in the drawings, the wire mesh is located midway between the two flat surfaces of the article or approximately midway between these two surfaces. In Fig. 3 where the canvas is shown the wire mesh is located midway of the thickness of the material, a layer of canvas being shown on each side of the wire mesh.

In the manufacture of this material the wire mesh is placed within the crude rubber previous to vulcanization. After vulcanization the wire mesh is therefore located in and forms a part of the article, being concealed by the rubber and giving the latter great strength and durability. When the canvas is employed, the layers of canvas, as well as the wire mesh, are also placed in the crude rubber and vulcanized therein, as above explained.

In Fig. 1 the white circles $A^3$ indicate bolt-holes through which the bolts (not shown) for fastening the top or lid of the steam-chest (not shown) are passed.

It must be understood that this material may be used in any relation where a device of this class is required. In the construction shown in the drawings a piece of the material shaped for a special purpose is employed; but it must be understood that the invention is not limited to any particular use or shape.

Having thus described my invention, what I claim is—

1. As an improved article of manufacture, gasket material composed of a layer of wire-mesh material and rubber, the rubber being vulcanized after the wire-mesh layer is placed therein whereby in the completed article the mesh material is concealed.

2. The herein-described gasket material composed of rubber and wire-mesh material, the rubber being vulcanized around the mesh material and the latter being located at equal distances from the surfaces of the article.

3. As an improved article of manufacture, gasket material composed of vulcanized rubber and an interposed layer of wire-mesh material fastened in the rubber by vulcanization.

4. As an improved article of manufacture, the herein-described gasket material composed of rubber, wire-mesh material and layers of canvas, the wire-mesh material being centrally located between the surfaces of the article, and the layers of canvas being placed on opposite sides thereof, the rubber being vulcanized after the layers of mesh material and canvas are put in place.

In testimony whereof I affix my signature in presence of two witnesses.

RALPH C. HANCE.

Witnesses:
GEO. W. HOLMES,
JOHN R. COLCHINS.